United States Patent [19]

Dotson

[11] 4,278,527
[45] Jul. 14, 1981

[54] ELECTROLYTIC CELL FOR PURIFYING AQUEOUS SOLUTIONS OF ALKALI METAL HYDROXIDES

[75] Inventor: Ronald L. Dotson, Cleveland, Tenn.

[73] Assignee: Olin Corporation, New Haven, Conn.

[21] Appl. No.: 80,758

[22] Filed: Oct. 1, 1979

Related U.S. Application Data

[62] Division of Ser. No. 3,151, Jan. 15, 1979, Pat. No. 4,189,362.

[51] Int. Cl.³ .................... C25B 9/00; C25B 11/02
[52] U.S. Cl. ................................. 204/272; 204/261
[58] Field of Search .............. 204/272, 273, 149, 212, 204/261

[56] References Cited

U.S. PATENT DOCUMENTS

| 567,503 | 9/1896 | Pelatan et al. | 204/273 X |
|---|---|---|---|
| 2,044,888 | 6/1936 | Overdick et al. | 204/9 |
| 2,194,781 | 3/1940 | Anorus | 204/149 |
| 3,459,646 | 8/1969 | Carlson | 204/153 |
| 3,583,897 | 6/1971 | Fulweiler | 204/273 X |
| 3,784,456 | 1/1974 | Otto | 204/153 |
| 3,853,722 | 12/1974 | Rigler et al. | 204/99 |
| 3,857,764 | 12/1974 | Jumer | 204/26 |
| 3,926,771 | 12/1975 | Lieb et al. | 204/273 X |

Primary Examiner—F. Edmundson
Attorney, Agent, or Firm—Ralph D'Alessandro; Donald F. Clements; Thomas P. O'Day

[57] ABSTRACT

Electrolytic apparatus is described for purifying an aqueous solution of an alkali metal hydroxide containing an impurity of a soluble heavy metal complex comprised of a heavy metal cation and a plurality of anions.

For example, an aqueous solution of sodium hydroxide containing a soluble heavy metal complex, such as mercuric polysulfide, $[HgS]^+S^-$, is charged to the electrolytic chamber of an electrolytic cell. An electric current is employed to reduce heavy metal cations to a separate phase in elemental form, and simultaneously to oxidize anions to a separate phase in elemental form, and to form a slurry of the separate phases in elemental forms in the aqueous solution.

The slurry is removed from the electrolytic chamber and the phases of elemental forms are separated from the purified aqueous solution. The purified alkali metal hydroxide solution is sold commercially or otherwise utilized.

11 Claims, 1 Drawing Figure

ELECTROLYTIC CELL FOR PURIFYING AQUEOUS SOLUTIONS OF ALKALI METAL HYDROXIDES

This is a division, of application Ser. No. 3,151, filed Jan. 15, 1979, now U.S. Pat. No. 4,189,362.

The present invention relates to apparatus utilized with a particular method for purifying aqueous solutions of alkali metal hydroxides by removing heavy metal contaminants and chemical groups which form complexes with heavy metal contaminants. The present invention may be utilized in apparatus employed for recovery of mercury compounds from chemical plant effluents and natural waters. More specifically, the present invention relates to the specific apparatus utilized with a particular electrolytic method for purifying an aqueous solution of sodium hydroxide by removing mercury and sulfide contaminants contained therein.

Heavy metal contaminants, such as mercury, are objectionable in most chemical processes and preparations involving sodium hydroxide. Various chemical and electrolytic methods have been employed to remove heavy metal contaminants, such as mercury, from aqueous solutions of sodium hydroxide.

U.S. Pat. No. 3,502,434, issued to John Buchanan MacMillan on Mar. 24, 1970, discloses a process for removing mercury from mercury cell liquor wherein the mercury is absorbed and then recovered from a composite bed of particulate material such as polyethylene shreds and a metal such as nickel or stainless steel.

U.S. Pat. No. 3,764,495, issued to Joel P. Guptill and Gary W. Foley on Oct. 9, 1973, discloses a method for removing mercury from mercury cell liquor wherein a mercury containing vapor is passed through a caustic potash solution in the presence of a small amount of a reducing agent.

U.S. Pat. No. 3,853,722, issued to Donald T. Rigler and Knut J. Johnsen on Dec. 10, 1974, discloses that sodium hydroxide from the denuder of a mercury cell may be electrolyzed in an electrolytic cell employing a porous cathode to reduce the concentration of mercury.

In spite of these methods, a need has remained in the industry for a method of sufficiently purifying aqueous solutions of sodium hydroxide, such as mercury cell caustic without employing additional and often costly process equipment.

OBJECTS

It is a primary object of the present invention to provide inexpensive, simple, and efficient apparatus for use in a particular method for purifying aqueous solutions of alkali metal hydroxides.

It is another object of the present invention to provide inexpensive, simple, and efficient apparatus for use in a particular method for removing trace levels of mercury from aqueous solutions of sodium hydroxide produced as mercury cell caustic in mercury cells.

A further object of this invention is to provide apparatus useable with an aqueous solution of sodium hydroxide which contains less than about 0.3 part per million of mercury by weight.

BRIEF DESCRIPTION OF THE INVENTION

The foregoing objects of the invention are accomplished in the process of this invention by electrolyzing an aqueous solution of an alkali metal hydroxide containing an impurity of a soluble complex comprised of a heavy metal cation and a plurality of anions, in an electrolytic cell having an electrolytic chamber containing therein an anode and a cathode separated from each other by a gap distance.

The aqueous solution of alkali metal hydroxide is charged to the electrolytic chamber and an electric current is passed between the anode and cathode to reduce heavy metal cations and transfer them to a separate phase in elemental form, to oxidize the complex anions to a separate insoluble phase in elemental form, and to form a slurry of these phases of elemental forms in the aqueous solution.

The slurry is removed from the electrolytic chamber and the phases of elemental forms are separated from the aqueous solution of alkali metal hydroxide.

DETAILED DESCRIPTION OF THE INVENTION

Figure 1:
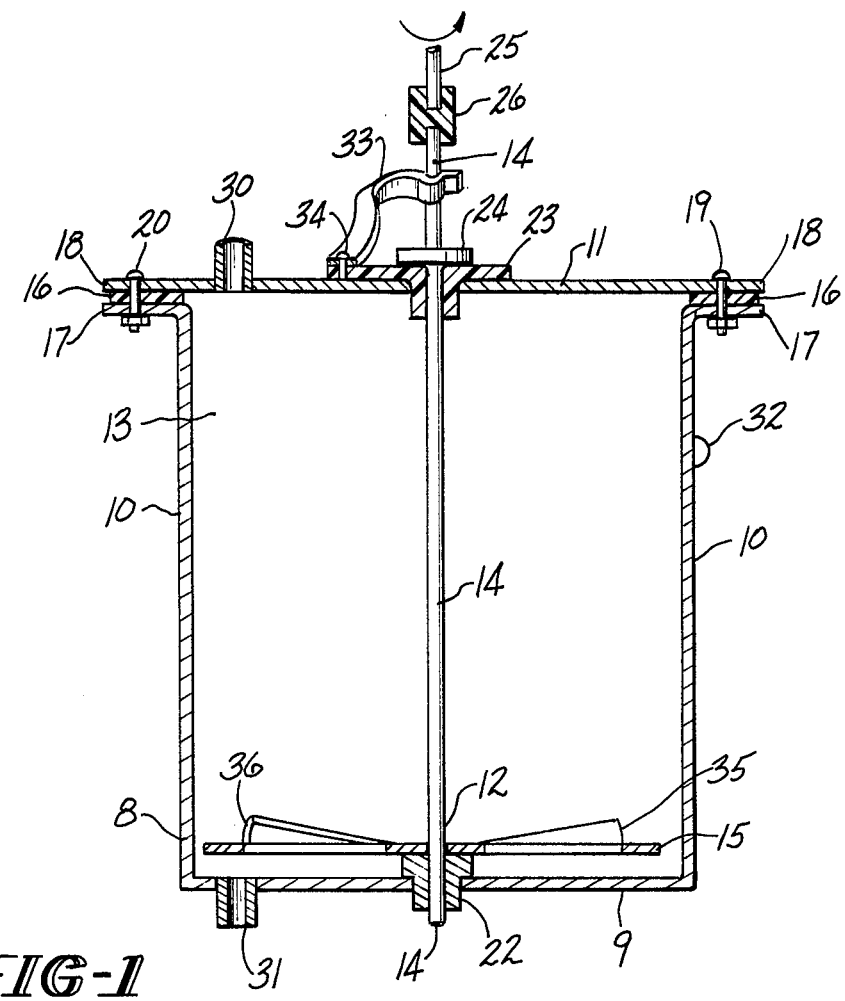
FIG. 1 shows a sectional view of a typical electrolytic cell useful in carrying out the process of the present invention.

More in detail, as shown in the typical cell of FIG. 1, circular electrolytic cell 8 is comprised of cell bottom 9, cylindrical side 10 secured thereto, a cell cover 11 secured to cylindrical side 10, and cathode assembly 12 contained within electrolytic chamber 13.

Cathode assembly 12 is comprised of rotatable shaft 14 and rotatable element 15 affixed to shaft 14.

Cell bottom 9 and cylindrical side 10 are of continuous fabrication. Cell cover 11 is attached to cylindrical side 10 by placing gasket material 16 atop cylindrical side flange 17.

Flange 18 of cell cover 11 is positioned atop gasket material 16. Bolts 19 and 20 are inserted through flange 18 of cell cover 11, gasket material 16 and cylindrical side flange 17, and are tightened.

Shaft 14 extends downward through cell bottom 9 and is insulated therefrom by bottom thrust bushing 22 suitably supported in cell bottom 9 which also prevents outflow of any aqueous solution contained in electrolytic chamber 13.

Shaft 14 extends upward through cell cover 11 and is insulated therefrom by top thrust bushing 23 which also prevents outflow of aqueous solution contained in electrolytic chamber 13.

A cathode assembly vertical support member 24 is affixed to shaft 14 and rides on top of thrust bushing 23.

The cathode assembly 12 is connected externally to a rotational driving means 25, such as an air motor of sufficient size and capacity to rotate the cathode assembly 12 at desired speed. An insulator coupling 26 is employed to connect shaft 14 with the rotational driving means 25. The speed of rotation of the cathode assembly 12 is in the range from about 50 to about 1000 and preferably in the range from about 100 to about 750 revolutions per minute.

Aqueous solution enters electrolytic chamber 13 through inlet 30, covers cell bottom 9, rotatable element 15, and substantially fills electrolytic chamber 13.

If desired, any aqueous solution contained within electrolytic chamber 13 may be removed through outlet 31.

Electric current is supplied to electrolytic cell 8 by attaching electrical leads (not shown) to conductive connections on the electrolytic cell 8.

For example, a positive lead (not shown) is attached to conductive anode connection 32 affixed to cylindrical side 10.

For the cathode, a flexible contact brush 33 is employed to contact shaft 14. Contact brush 33 is attached to top thrust bushing 23 by cathode pin 34. Current to the cathode assembly is achieved by attaching a negative lead (not shown) to cathode pin 34. Current flows through cathode pin 34 to contact brush 33 to shaft 14 of cathode assembly 12 to rotatable element 15.

In a preferred embodiment, the gap distance between cell bottom 9 and the rotatable element 15 is maintained uniform at all points facing one another. For maximum exposure of the electrolytic surface, the face of rotatable element 15 should be parallel to cell bottom 9. If desired, the rotatable element 15 to cell bottom 9 distance may be varied to maintain optimum cell current efficiency.

The gap distance employed is in the range from about 0.1 to about 2.0 and preferably in the range from about 0.2 to about 1.0 centimeters.

Although the preferably shape of the rotatable element 15 is a circular disc, it is understood that the construction of the rotatable element 15 may be either solid, felt, mesh, foraminous, expanded metal, or any other design.

The diameter of the disc employed as the rotatable element 15 will necessarily be less than the internal diameter of electrolytic cell 8. In general, the diameter of the disc employed will be less than the internal diameter of the particular electrolytic cell employed in the range from about 0.1 to about 0.5, and preferably in the range from about 0.2 to about 0.4 centimeter.

If desired, the thickness of the disc may be varied. Generally, the thickness of the disc is in the range from about 0.1 to about 0.5 and preferably in the range from about 0.2 to about 0.4 centimeter.

It is preferred that the contents of electrolytic chamber 13 be highly agitated during electrolysis. Fluted vanes 35 and 36 are located on rotatable element 15 as shown in FIG. 1. Fluted vanes 35 and 36 are small sections or lips of rotatable element 15 which are partially cut from the rotatable element 15 and then bent to protrude from the rotatable element 15.

The speed of rotation of the cathode assembly 12 is in the range from about 50 to about 1000 and preferably in the range from about 100 to about 750 revolutions per minute.

As the rotatable element 15 is rotated, for example, counterclockwise as shown by the arrow in FIG. 1, the fluted vanes 35 and 36 provided agitation of the aqueous solution, such as sodium hydroxide, through the rotatable element 15, so that a high degree of agitation is maintained within electrolytic chamber 13.

Figure 2:
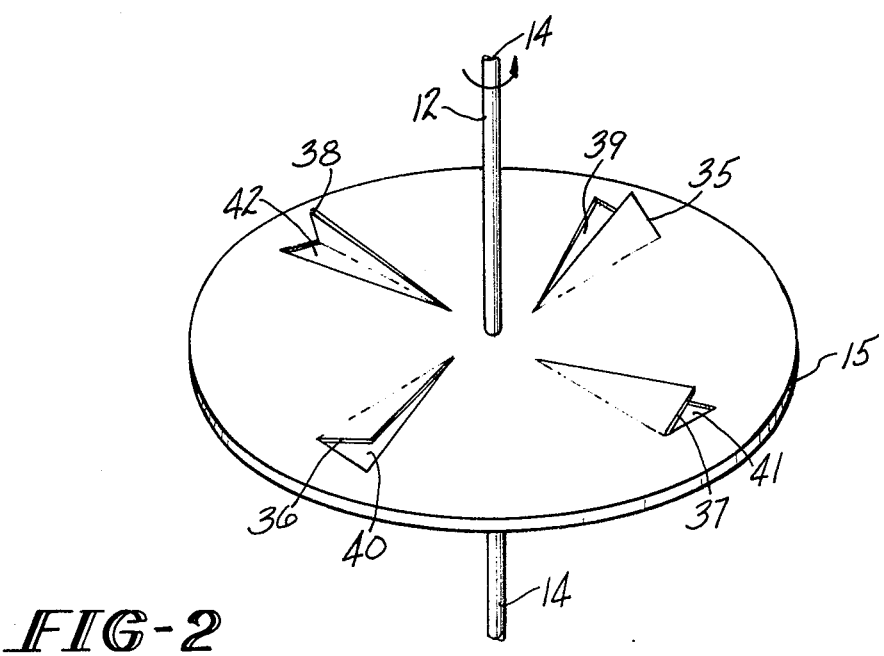
FIG. 2 shows an oblique view of a typical cathode assembly useful in carrying out the process of the present invention.

FIG. 2 shows an oblique view of a typical cathode assembly 12 comprised of shaft 14 and circular rotatable element 15. Fluted vanes 35, 36, 37 and 38 are located on rotatable element 15 as shown. As cathode assembly 12 is rotated, for example, in the direction indicated by the arrow, for example, counterclockwise, any solution within the electrolytic chamber is deflected by fluted vanes 35, 36, 37 and 38 and pumped through apertures 39, 40, 41 and 42 in rotatable element 15.

Any convenient means for maintaining a high degree of agitation within electrolytic chamber 13, FIG. 1, may be employed, for example, a propeller or series of propellers, suitably positioned within electrolytic chamber 13 or, for example, attached to cathode assembly 12.

In the same preferred embodiment, the cell bottom 9 and cylindrical side 10 are of continuous fabrication and are employed as an anode. If desired, anodes may be employed within electrolytic chamber 13, and the cell bottom 9 and cylindrical side 10 insulated therefrom.

Examples of material which may be employed as an anode include those selected from a group consisting of nickel, platinized titanium, platinized tantalum, platinized platinum, and nickel deposited on any substrate capable of bonding with nickel such as nickel on type 316 stainless steel, nickel on type 317 stainless steel, and mixtures thereof.

In general, any material that is capable of evolving oxygen without corrosion in aqueous sodium hydroxide solution, and capable of effecting the electrolytic oxidation of an anion hereafter described to the elemental form of that anion, may be employed as anode material of construction.

Examples of material which may be employed as a cathode assembly 12 include those metals which readily amalgamate with mercury. Cathode materials of construction are chosen from a group consisting of copper, gold, silver, and deposits of copper, gold and silver on any substrate capable of bonding with copper, gold and silver, such as deposits of copper, gold, and silver on type 316 stainless steel and deposits of copper, gold and silver on 317 stainless steel and mixtures thereof.

In general, any material that is capable of effecting the electrolytic reduction of the cation of the heavy metal hereafter described to the elemental form may be employed as a cathode material of construction in the process of this invention.

A plurality of anodes and a plurality of cathode assemblies 12 may be employed in the process of this invention, for example, a series of rotatable elements 15 may be affixed to shaft 14 within the electrolytic chamber 13.

In addition, any geometric pairing of anodes and cathode assemblies 12 may be employed.

The anode and the cathode assembly 12 may be stationary in the process of this invention, however, it is preferred that the electrolytic cell employ at least one rotatable electrode, preferably a rotatable cathode assembly.

One skilled in the art will recognize that the electrolytic cell employed in carrying out the process of this invention may be a commercially available or a custom-built electrolytic cell of a size and electrical capacity capable of economically producing the desired purified product.

Aqueous solutions of alkali metal hydroxides which may be purified by the process of this invention include aqueous solutions of sodium hydroxide, potassium hydroxide, lithium hydroxide and mixtures thereof having a concentration in the range from about 5 to about 95% metal hydroxide by weight.

As used throughout the description and claims, the term "heavy metal" is defined as any metal which is capable of combining with a complexing group to form a heavy metal complex of the form $[MC]^+X^-$, where M is any heavy metal selected from a group consisting of mercury, arsenic, antimony, bismuth, tin and mixtures thereof, where C and X are a "complexing group" or any electron donor either ionic or nonionic and capable of combining with M, the heavy metal previously described, to form a complex of the type $[MC]^+X^- \cdot C$ and X may be the same or different complexing group.

A typical aqueous solution of alkali metal hydroxide containing heavy metals and complexing agents as contaminants which may be purified according to the process of this invention is an aqueous solution of sodium hydroxide produced as an effluent from the mercury cell known as mercury cell caustic. The same purification may be applied to other aqueous solutions containing contaminant heavy metals, but for simplicity, the process of this invention is hereafter described more particularly with respect to the purification of mercury cell caustic. Such description is not to be construed as limiting the usefulness of the invention or the scope of the appended claims.

The aqueous sodium hydroxide purified by the apparatus and process of this invention is produced in a mercury cell.

Mercury cells are comprised of an enclosed, elongated trough which slopes slightly toward one end and have a cathode and anodes. The cathode is a flowing layer of mercury which is introduced at the higher end of the cell and flows along the bottom of the cell toward the lower end. The anodes are generally comprised of foraminous metal or rectangular blocks of graphite suspended from conductive lead-ins so that the bottom of the anodes is spaced a short distance above the flowing mercury cathode. An aqueous electrolytic solution, for example, a brine of sodium chloride is fed to the upper end of the cell, covering the anodes and flowing concurrently with the mercury. The impressed electric current passing through the electrolytic solution between the anodes and the mercury cathode liberates chlorine at the anodes and sodium is dissolved in the mercury as an amalgam. The sodium mercury amalgam flows from the lower end of the cell to a decomposer where it is contacted with water to form hydrogen, elemental mercury and an aqueous solution of sodium hydroxide, commonly known an mercury cell caustic.

The mercury cell caustic is thereafter separated from the hydrogen and mercury.

The pH of the aqueous solution of mercury cell caustic is in the range from about 7 to about 14 and preferably in the range from about 8 to about 13.

The concentration of sodium hydroxide in the mercury cell caustic is in the range from about 25 to about 75 and preferably in the range from about 40 to about 60% by weight sodium hydroxide.

In addition to containing sodium hydroxide, the mercury cell caustic may contain small concentrations of heavy metals, such as mercury.

In abnormal mercury cell plant operation, a small percentage of heavy metal, such as mercury, may be reacted to the ionic state and combined with other elements, for example, sulfur, in the form of sulfide, $S^=$, to form compounds, such as insoluble mercuric sulfide, HgS. Heavy metal sulfides, such as mercuric sulfide, are relatively insoluble in the mercury cell caustic and may be recovered therefrom by conventional methods, for example, centrifugation, filtration, coalescence, absorption and the like.

Without being bound by theory, it is believed that the relatively insoluble heavy metal sulfur compounds, such as mercuric sulfide, previously described may further combine with additional sulfur to form a soluble heavy metal polysulfide complex of the form $[HgS]^+S^-$. For example, insoluble mercuric sulfide, HgS, may further combine with additional sulfur in the form of sulfides to form a soluble mercury polysulfide complex of the form $[HgS]^+S^-$. The mercuric polysulfide complex is highly soluble in the mercury cell caustic in sharp contrast to the highly insoluble mercuric sulfide, HgS.

With the apparatus employed in the process of this invention, mercury cell caustic of the type described above contaminated with a complex of a heavy metal polysulfide such as mercuric polysulfide, $[HgS]^+S^-$, and having an equivalent concentration of mercury in the range from about 0.5 to about 1000 parts per million of mercury by weight, is charged to electrolytic chamber 13 of an electrolytic cell of the type previously described, or other convenient design.

However, the apparatus of this invention may be employed with the process disclosed herein for mercury cell caustic having equivalent concentrations of mercury above about 1000 parts per million mercury by weight as well.

In operation of the process of this invention, direct current is supplied to the cell and a voltage is impressed across the cell terminals. The cell voltage employed is in the range from about 1.0 to about 4.0 and preferably in the range from about 2.0 to about 3.0 volts.

Without being bound by theory, it is believed that as an electric current is passed between the anode and the cathode, that on the cathode, heavy metal cations such as $Hg^{++}$ are reduced to a separate phase, $Hg°$, in elemental form, and anions such as $S^=$, are liberated from the mercuric polysulfide complex. It is believed that the cathode reaction is represented by Equation (1):

$$2e^- + [HgS]^+S^- \rightarrow Hg° + S^= \qquad (1)$$

where Hg° represents elemental mercury.

Without being bound by theory, it is believed on the anode, that anions, such as sulfide, $S^=$, are oxidized to a separate phase, S°, in elemental form. It is believed that the anode reaction is represented by Equation (2):

$$S^= \rightarrow S° + 2e^- \qquad (2)$$

where S° represents elemental sulfur; however, further oxidation is possible with increased cell potential at the anode to give:

$$S° + O_2 \rightleftharpoons SO_2$$

$$SO_2 + xH_2O \rightleftharpoons SO_4^{-2} + 4H^+ + (x-2)H_2O + 2e^-$$

$$SO_3^{-2} + 2OH^- \rightleftharpoons SO_4^{-2} + H_2O + 2e^-$$

Completion of the reactions represented in Equation (1) and Equation (2) results in the formation of a slurry of the phases of elemental forms, such as Hg°, and S°, in the aqueous solution.

The reaction period required for the completion of the reaction represented in Equation (1) is dependent on the electrolytic cell geometry but is generally in the range from about 2 to about 40 and preferably in the range from about 3 to about 30 minutes.

The operating temperatures of the electrolytic cell is in the range from about $-10°$ to about 80° and preferably in the range from about $-5°$ to about 40° C.

The pressure of the electrolytic cell is essentially atmospheric, although subatmospheric or superatmospheric pressure may be employed.

The resulting slurry of phases in aqueous sodium hydroxide is withdrawn from the electrolytic cell 8 through, for example, outlet 31, FIG. 1.

The phases of elemental forms are separated from the aqueous solution by any suitable solid-liquid separation technique, such as by filtration, centrifuging, settling, and the like. Filtration is the preferred form of solid-liquid separation although any other suitable solid-liquid separation technique may be employed. When filtration is employed, it is preferable to employ an inorganic or organic filter precoat such as a diatomaceous earth, a cellulosic-based material, or a silica-based microporous material.

The phases of elemental forms separated from the aqueous solution contain a minimal amount of residual aqueous solution and may be disposed of as waste, or otherwise utilized.

Further separation of the phases of elemental forms may be employed, for example, by retorting to separate elemental mercury from elemental sulfur.

The purified aqueous solution of alkali metal hydroxide produced by the separation contains concentrations of heavy metals, such as mercury, of less than about 0.3 part per million by weight mercury, and is sold commercially or otherwise utilized.

The electrolytic cell of the process of this invention can be operated on a batch or flow-through system. In the latter system, the aqueous solution is continuously circulated to and from an external storage vessel. In addition, at least a portion of the aqueous solution is separated from the electrolytic chamber and external storage vessel.

Typically, the heavy metal complex is formed in situ in the aqueous solution of alkali metal hydroxide purified in the process of this invention.

However, if desired, additional complexing anions may be added to the aqueous solution of alkali metal hydroxide to permit removal of the heavy metal cation.

Either inorganic or organic compounds complexing agents which provide the additional complexing ions may be employed.

Although sulfur in the form of sulfide ions is typically present in aqueous solution of alkali metal hydroxides, such as mercury cell caustic, as described above, other inorganic complexing agents which may be employed in the process of this invention include (i) alkali metal thiosulfates such as sodium thiosulfate, potassium thiosulfate and mixtures thereof, (ii) alkaline earth metal thiosulfates such as calcium thiosulfate, magnesium thiosulfate and mixtures thereof, (iii) alkali metal thiocyanates such as sodium thiocyanate, potassium thiocyanate and mixtures thereof, (iv) alkaline earth metal thiocyanates such as calcium thiocyanate, magnesium thiocyanate and mixtures thereof, (v) alkali metal oxylates such as sodium oxylate, potassium oxylate and mixtures thereof, (vi) alkaline earth metal oxylates such as calcium oxylate, magnesium oxylate and mixtures thereof, (vii) alkali metal cyanides such as sodium cyanide, potassium cyanide and mixtures thereof, (viii) alkaline earth metal cyanides such as calcium cyanide, magnesium cyanide and mixtures thereof. (ix) alkali metal sulfides such as sodium sulfide, potassium sulfide and mixtures thereof, (x) alkaline earth metal sulfides such as calcium sulfide, magnesium sulfide and mixtures thereof, (xi) alkali metal orthophosphates such as sodium orthophosphate, potassium orthophosphate and mixtures thereof, (xii) alkaline earth metal orthophosphates such as calcium orthophosphate, magnesium orthophosphate and mixtures thereof, (xiii) alkali metal pyrophosphates such as sodium pyrophosphate, potassium pyrophosphate and mixtures thereof, (xiv) alkaline earth metal pyrophosphate such as calcium pyrophosphate, magnesium pyrophosphate and mixtures thereof, (xv) alkali metal triphosphates such as sodium triphosphate, potassium triphosphate and mixtures thereof, (xvi) alkaline earth metal triphosphates such as calcium triphosphate, magnesium triphosphate and mixtures thereof, (xvii) mixtures of alkali metal thiosulfates, alkaline earth metal thiosulfates, alkali metal thiocyanates, alkaline earth metal thiocyanates, alkali metal oxylates, alkaline earth metal oxylates, alkali metal cyanides, alkaline earth metal cyanides, alkali metal sulfides, alkaline earth metal sulfides, alkali metal orthophosphates, alkaline earth metal orthophosphates, alkali metal pyrophosphates, alkaline earth metal pyrophosphates, alkali metal triphosphates and alkaline earth metal triphosphates.

Other complexing agents include ammonia, propylene diamine, triethanolamine, citric acid, glyconic acid, oxalic acid, glycine, $\alpha$-$\alpha'$-dipyridyl and mixtures thereof.

Preferred inorganic complexing agents include those selected from a group consisting of sulfur, sodium sulfide, potassium sulfide, sodium pyrophosphate, sodium triphosphate, and mixtures thereof.

Organic complexing agents include compounds selected from the group consisting of trimethylamine, tributylamine, triethylamine, tripropylamine and mixtures thereof.

Other organic complexing agents include compounds selected from the group consisting of trimethylphosphine, triethylphosphine, tripropylphosphine, tributylphosphine and mixtures thereof.

Another example of a suitable family of organic complexing agents include compounds selected from a group consisting of trimethylarsine, triethylarsine, tripropylarsine, and mixtures thereof.

Preferred organic complexing agents include complexing agents selected from a group consisting of ethylene diamine, ethylene diamine tetraacetic acid, ethylene diamine diacetic acid and mixtures thereof.

It is recognized that inorganic and organic complexing agents may be employed simultaneously, for example, these complexing agents selected from a group consisting of sulfur, sodium sulfide, potassium sulfide, sodium pyrophosphate, sodium triphosphate, ethylene diamine, ethylene diamine tetraacetic acid, ethylene diamine diacetic acid, and mixtures thereof.

Although reference has been made primarily to the treatment of relatively high concentrations of caustic solutions such as those obtained directly from the operation of electrolytic mercury cells, the method is also applicable to the removal of mercury contained in weak caustic solutions and effluents.

This method is also applicable to the removal of organic and inorganic mercury from chemical plant effluents and other aqueous solutions such as water.

The present invention may be employed to purify brine containing contaminants of the nature which are picked up from a mercury cell, and to the purification of brine regardless of contaminant source. The brine will generally be an aqueous solution of sodium chloride. However, the present invention may be employed to purify brines or aqueous solutions of other alkali metal hydrides such as potassium chloride, lithium chloride, rubidium chloride, and cesium chloride. The process of the present invention would include the removal of mercury, which is present as an ion, from the aqueous brine solution of any metal chloride which is sufficiently electropositive such that hydrogen gas, rather than the metal, is liberated at the cathode.

Brines containing in the range from about 110 to about 350 grams of sodium chloride per liter of solution may be treated effectively. However, brine containing greater or lesser amounts of sodium chloride may be purified using the present invention. The brine will, in actuality, rarely contain less than about 50 grams of NaCl per liter. The brine, for practical reasons, preferably should be acidic, having a pH in the range from about 1 to about 5, although brine that is alkaline may also be purified by the present invention.

The following example is presented to define the invention more fully without any intention of being limited thereby. All parts and percentages are by weight unless indicated otherwise.

EXAMPLE 1

About 300 milliliters of an aqueous solution containing about 44.8 parts per hundred sodium hydroxide, about 2.1 parts per million dissolved mercury, and about 1.8 parts per million dissolved sulfur, was purified by electrolysis in an electrolytic cell.

Without being bound by theory, it is believed that the dissolved mercury and dissolved sulfur were present in the aqueous solution of sodium hydroxide as a highly soluble mercuric polysulfide complex.

The electrolytic cell had a design similar to that of FIG. 1. The anode was a circular nickel plate about 0.25 centimeter thick, about 2.5 centimeters wide, and was bent in the shape of a rectangle about 6.25 centimeters in width and about 10 centimeters in height.

The cathode was a circular copper disc of design similar to that of FIG. 2. The cathode was comprised of a 0.16 centimeter thick copper sheet having four fluted vanes and was about 5.75 centimeters in diameter and about 0.16 centimeter in thickness.

The cathode was attached to about 0.65 centimeter circular rotatable copper shaft.

The cell cathode had an exposed area of about 19 square centimeters. The cathode shaft protruded through and was insulated from the top of the nickel anode.

The anode and cathode were contained in 500 milliliter standard laboratory glass flask.

The cathode disc was positioned parallel to the bottom of the nickel anode at a distance of about 0.32 centimeter from the nickel anode.

At the top of the container, the rotatable cathode was secured in a liquidtight fashion and insulated from the nickel anode by employing a polytetrafluoroethylene bushing placed between the cathode shaft and the nickel anode.

Electrical connections were made to the cell container body and to the rotatable cathode. The positive terminal of a direct current electric supply (about 2 volts) was directly connected to the container body and brush.

A silver impregnated graphite brush means was employed to connect a negative current lead to the rotatable cathode shaft insulated from and external to the cell body.

About 300 milliliters of a solution previously described was added to the 500 milliliter standard laboratory glass flask containing the anode and cathode.

The electric current was turned on and the solution was electrolyzed at about 25° C., and at a constant voltage of about 2.0 volts. The cell current averaged about 0.32 amperes.

The cathode disc was rotated at about 600 revolutions per minute. The gap between the cathode disc and the cell bottom was about 0.25 centimeter.

After about 3 minutes, the electrolysis was stopped. The entire solution was removed from the cell and filtered through a laboratory filter precoated with a diatomaceous earth to separate the precipitated solids from the purified solution.

The purified solution was found by analysis to contain about 45.0 parts per hundred sodium hydroxide, about 0.12 part per million mercury, and about 1.2 parts per million sulfur with the remainder essentially water.

What is claimed is:

1. An electrolytic cell for electrolyzing an aqueous solution of an alkali metal hydroxide containing an impurity of a soluble heavy metal complex, comprised of
   (a) a conductive bottom,
   (b) conductive sides secured to said conductive bottom, said sides having an insulated flange at the top thereof, and forming in combination with said conductive bottom a first electrode,
   (c) a cell cover positioned atop said insulated flange to form an electrolytic chamber,
   (d) an inlet for feeding said solution into said cell and an outlet for removing purified solution from said cell,
   (e) a rotatable assembly comprised of
       (1) at least one rotatable shaft,
       (2) at least one second conductive metal electrode secured to said shaft and positioned adjacent to but spaced apart from said conductive bottom,
       (3) said second conductive metal electrode having at least one fluted vane with at least one adjacent aperture therein so that when rotated said fluted vane agitates said aqueous solution while the aqueous solution is deflected through said aperture towards the conductive bottom, and
   (f) means for maintaining a potential difference between said first conductive metal electrode and said second electrode.

2. The electrolytic cell of claim 1, wherein said shaft extends through and is insulated from said cover.

3. The electrolytic cell of claim 2, wherein said shaft extends through and is insulated from said bottom.

4. The electrolytic cell of claim 3, wherein said first metal conductive electrode is employed as a cathode.

5. The electrolytic cell of claim 3, wherein said second metal conductive electrode is employed as a cathode and said bottom and said sides are employed as an anode.

6. The electrolytic cell of claim 5, wherein said rotational driving means is an air motor.

7. The electrolytic cell of claim 6, wherein the distance between said first conductive metal electrode and said conductive bottom is maintained by a support member attached to said shaft above said cell cover.

8. The electrolytic cell of claim 7, wherein said side has a cylindrical shape.

9. The electrolytic cell of claim 8, wherein said bottom and side are of continuous fabrication of conductive metal.

10. The electrolytic cell of claim 9, wherein said anode is comprised of a material selected from a group consisting of nickel, platinized titanium, platinized tantalum, platinized platinum, nickel on type 316 stainless steel, nickel on type 317 stainless steel, and mixtures thereof.

11. The electrolytic cell of claim 10, wherein said assembly is comprised of a material selected from a group consisting of copper, gold, silver, deposites of copper, gold, and silver on type 316 stainless steel, deposits of copper, gold, and silver on 317 stainless steel and mixtures thereof.

* * * * *

UNITED STATES PATENT AND TRADEMARK OFFICE
CERTIFICATE OF CORRECTION

PATENT NO. : 4,278,527
DATED : July 14, 1981
INVENTOR(S) : Ronald L. Dotson

It is certified that error appears in the above—identified patent and that said Letters Patent are hereby corrected as shown below:

In column 3, at line 54, please change "provided" to --provide--.

In column 8, at line 67, please delete "hydrides" and insert therefor --halides--.

Claim 4 should read as follows:

4. The electrolytic cell of claim 3, wherein said first metal conductive electrode is employed as a cathode and said bottom and said side are employed as an anode.

Signed and Sealed this

Thirteenth Day of April 1982

[SEAL]

*Attest:*

*Attesting Officer*

GERALD J. MOSSINGHOFF

*Commissioner of Patents and Trademarks*